Oct. 29, 1946.　　　　A. BACH　　　　2,410,002
GYROSCOPE
Filed May 7, 1941
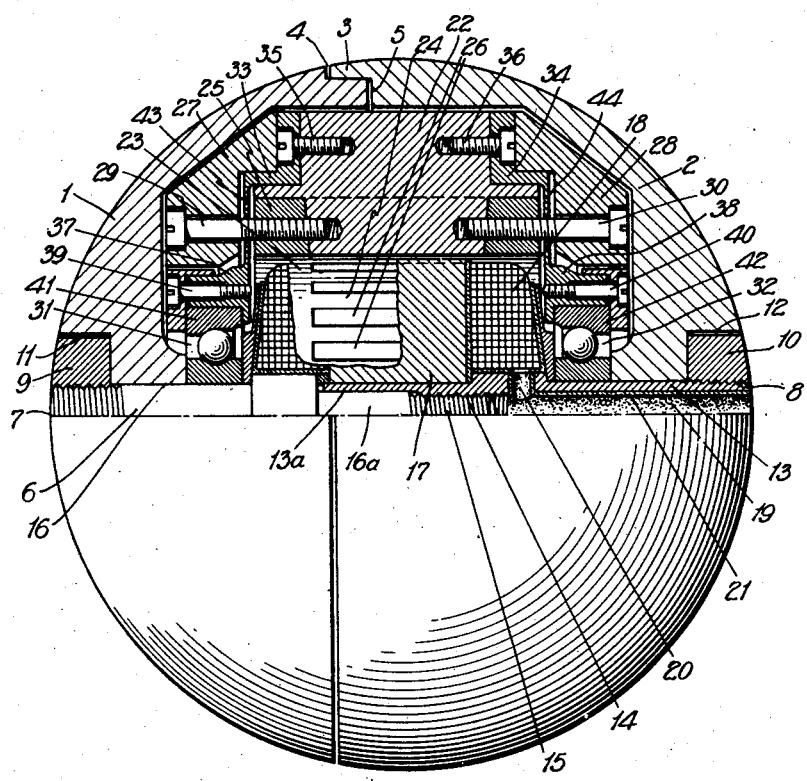
INVENTOR.
ADOLF BACH
BY
ATTORNEYS.

Patented Oct. 29, 1946

2,410,002

UNITED STATES PATENT OFFICE 2,410,002

GYROSCOPE

Adolf Bach, Berlin-Spandau, Germany; vested in the Alien Property Custodian

Application May 7, 1941, Serial No. 392,246
In Germany July 31, 1939

8 Claims. (Cl. 172—36)

The invention relates to gyroscopes, such as are employed in airplanes for navigation and control purposes. It is essential that such gyroscopes occupy as small a space as possible. The gyros employed, for instance, in azimuth gyros and horizon gyros are, as a rule, suspended in gimbals. The gyro itself is in most cases arranged in a closed casing which forms the inner gimbal ring and the casing is pivotally mounted in an outer gimbal ring.

The gyro casing may consist of a sectional spherical casing. According to the invention the spherical casing of the gyro is designed in such a manner that the parts of the spherical casing, made preferably of two spherical parts, may be assembled with the aid of a bracing member extending diametrically through the casing and that the bracing member serves at the same time as an axle about which the gyro flywheel mass rotates, which mass is designed in the form of an outer rotor.

In the accompanying drawing is shown an embodiment of such a gyroscope in diagrammatic form.

The casing of the gyroscope is designed in the form of a spherical casing and consists of two parts 1 and 2 substantially of the same size. The spherical part 2 is provided with a flange 3 which cooperates with a circular shoulder 4 of the part 1. The joint 5 between the two spherical parts does not lie exactly in the central plane passing through the center of the casing and perpendicular to the axis of rotation, but is displaced axially with respect to this plane by a small amount. In this manner it is possible to provide at any point on the spherical surface pins which lie in the said central plane, or to provide corresponding flanges for such pins. Under circumstances the flange 3 may have a fitting face on the shoulder 4.

The two spherical parts 1 and 2 may be assembled with the aid of a bracing member 6 extending therethrough diametrically of the casing, and the bracing member serves at the same time as an axle around which the gyro flywheel mass rotates, which mass is designed in the form of an outer rotor.

Consequently, the axle is fixedly mounted in bearings. Both ends of the bracing member are provided with threaded portions 7 and 8 which serve to brace the two spherical parts. These two threaded ends cooperate with nuts 9 and 10 respectively. These nuts serve as tightening means and are arranged in corresponding recesses 11 and 12 provided in the two spherical parts 1 and 2 at the outer ends of threaded portions 7 and 8, said nuts cooperating with the threaded portions of axle 6 to brace the two spherical parts 1 and 2 and thereby form a completely closed casing for the gyro, the nuts being flush with the spherical surface of the casing.

The gyro axle 6 forming the bracing member for the two spherical parts is made of two parts. The one part 13 of the axle is provided with a threaded portion 14 which cooperates with a corresponding threaded portion 15 of the other part 16 of the axle. Consequently, the part 13 is designed in the form of a screwed joint (screwed cap), the portion 13a of which surrounds the portion 16a of part 16. Between the portions 13a and 16a is provided a fitting face by means of which the axle is centered, as well as the two spherical parts with respect to the axle, since the two spherical parts 1 and 2 with the fitting faces at 4 and 5 are arranged on the corresponding parts 16 and 13 of the axle 6. The stator field winding of an electric gyro drive is secured to the part 13 of the stationary axle 6. The stator laminations are denoted by the numeral 17 and the stator winding by the numeral 18. To supply current to the stator winding, the part 13 of the axle 6 is provided with an axial bore 19 and a radial bore 20 which are lined with insulating material 21 so that the current may be supplied to the inside of the gyro casing in a simple manner.

The axial cross-section of the inner space of the casing is adapted to the axial cross-section of the gyro rotor in the manner that the gyro rotor moves with the smallest possible clearance within the casing. The gyro rotor is made in the present embodiment of three parts. The rotor laminations constitute the central part 22 of the electric drive which consists of a three-phase squirrel-cage rotor. The rotor copper is denoted by the numeral 23 and has corresponding armature bars 24 as well as short-circuiting rings 25 connecting the same. The teeth of the rotor are denoted by the numeral 26. The two lateral parts 27 and 28 arranged symmetrically with respect to the central part 22 are firmly secured to the central part by means of screws 29 and 30. To increase the gyro couple the lateral parts 27 and 28 may consist of a material of high specific gravity, for instance of a highly refractory metal.

The gyro rotor is rotatably mounted about the stationary axle 6 with the aid of ball bearings 31 and 32. To support the gyro rotor, particular supporting members 33, 34 are provided, which members are secured in the embodiment shown to the central part 22 of the rotor by means of the screws 35 and 36. The latter may, however, be dispensed with and the securing of the supporting members 33 and 34 may be effected by the clamping action of the parts 27 and 28 which in turn are secured to the central part by means of the screws 29 and 30. These supporting members are designed in the form of disks and the inner edges thereof are provided with hub-shaped flanges 37 and 38 respectively, which flanges are firmly secured to the magneto-type ball bearing rings 41 and 42 by screws 39 and 40. Between each fastening flange 33 or 34 arranged on the outer edge, and corresponding hub-shaped flange 37 or 38 arranged on the inner edge, is provided a diaphragm resilient intermediate part 43 or 44. With the aid of the above-mentioned supporting members the gyro rotor may be mounted in a particularly advantageous manner to compensate for the expansions of the gyro rotor due to heat. When the gyro is assembled these supporting members are placed under tension, taken up by the magneto-type bearing of the two bearing rings 41 and 42. The tension is brought about by the fact that the diaphragm-like intermediate part is made resilient. The tension is calculated on the basis of a non-revolving gyro and so chosen that it disappears upon the occurrence of thermal expansions of the gyro in operation, i. e., if the gyro rotor revolves at the operating speed. Fluctuations of heat with the gyro in operation are relatively insignificant as compared to the expansion when passing from the state of rest to the state of operation. By mounting the gyroscope in the manner mentioned above the bearing friction is not influenced, or only to a slight extent, as a result of the expansions due to heat. On the other hand particular auxiliary means are avoided as are employed in the known arrangements in which these means are in part very complicated and in part do not bring about the desired effect. A further advantage presented by the symmetrical arrangement of the supporting members 33 and 34 in relation to the central part 22 of the gyro rotor consists in the fact that with respect to the central plane the expansions of the central portion exert the same action in the supporting members at both sides. In this manner the position of the center of gravity of the gyroscope is practically uninfluenced by the expansions due to heat. In the diaphragm-like intermediate members 43 and 44 are provided corresponding enlarged bores for the screws 29 and 30 so that the said members do not come into contact with these screws.

The joint 5 as well as the joints between the nuts 9 and 10 and the corresponding recesses 11 and 12 in both parts of the casing may be sealed by means of a suitable packing so that the casing is completely air-tight. In this manner the penetration of moisture, dirt and the like is prevented.

The rotor copper bars may be amply dimensioned so that no undue heating up of the three-phase drive is to be expected. It is therefore not necessary to provide particular air passages or the like through which the interior of the casing is brought into communication with the outside atmosphere.

The gyro rotor is made of three parts 22, 27, 28 having the cross-section shown in the drawing. It is also possible according to the invention to give the gyroscope any axial cross-section and to design the axial cross-section of the inner space of the casing in a corresponding manner. The three parts of the gyro rotor are secured by means of screws or in any other suitable manner. The gyro casing may consist of any suitable material. A ferro-magnetic material is preferably employed for the casing for shielding the inner magnetic field. The two ends of the axis of rotation of the gyro are made flush with the surface of the spherical parts. It is also possible to provide corresponding devices, for instance, devices in the form of screw lockings in order to prevent the nuts serving to secure the axis of rotation of the gyro from becoming loose. In this case these devices may be arranged in such a manner as to lie inside the outer spherical surface of the gyro casing. Therefore the shape of the gyro casing is such that when the axis of rotation of the gyro is mounted and both spherical parts are secured together no projecting parts are present.

What is claimed is:

1. A gyroscopic element, particularly for gyro indicators for aircraft or watercraft, comprising a gyro rotor, a spherical casing enclosing said rotor, said casing being composed of a plurality of spherical sections, and a bracing member located entirely within and extending diametrically through the space enclosed by the casing periphery, said sections being secured to said bracing member, and said bracing member forming also an axle for said gyro rotor.

2. In a gyroscopic element as set forth in claim 1, said casing consisting of two spherical half-shells and having tightening nuts for securing said shells to said bracing member, said shells having recesses for receiving said nuts, respectively, so that the latter are flush with the outer spherical surface of the casing.

3. In a gyroscopic element as set forth in claim 1, said bracing member consisting of two parts having threaded portions, respectively, engaging each other so as to form a screwed joint, one of said parts surrounding the other partially and having a fitting face so as to center the spherical parts of the casing.

4. In a gyroscopic element as set forth in claim 1, an electric drive motor having a stator field winding arranged on said axle consisting of said bracing member, and said bracing member being provided with axial and radial bores for supplying current to said stator field winding.

5. In a gyroscopic element as set forth in claim 1, said gyro rotor having disk-shaped supporting members containing each a diaphragm-like resilient intermediate portion, and ball bearings having each an inner bearing portion mounted on said axle-like bracing member and an outer bearing portion connected with one of said supporting members.

6. In a gyroscopic element as set forth in claim 1, said gyro rotor having disk-shaped supporting members containing each a diaphragm-like resilient intermediate portion, and ball bearings having each an inner bearing portion mounted on said axle and an outer bearing portion connected with said supporting members, respectively, said diaphragm-like intermediate members, being under tension when the gyro is not in operation, in order to compensate for the thermal expansions of said gyro rotor when in operation so as to maintain the location of the center of gravity.

7. In a gyroscopic element as set forth in claim 1, said gyro rotor having a central portion forming the rotor iron of a squirrel-cage motor and two lateral parts symmetrically arranged and consisting of a material of a high specific gravity, said lateral parts being firmly connected with said central part.

8. A gyroscopic element comprising a substantially spherical casing formed from two substantially hemispherical members, a diametrically disposed stationary axle for securing said members together, said axle being located entirely within the space enclosed by the spherical surface of said casing, a pair of spaced disk-shaped supporting rings mounted for rotation on said axle a fixed distance apart and within said casing, an annular rotor concentrically arranged about said axle between said spaced rings, and a pair of normally tensioned resilient diaphragms respectively connecting said spaced rings with said annular ring whereby compensation will be provided for the thermal expansion of said rotor when in operation.

ADOLF BACH.